UNITED STATES PATENT OFFICE 2,442,729

METHOD OF PREPARING MELAMINE

Alexander F. MacLean, Stamford, Conn., assignor to American Cyanamid Company, New York, N. Y., a corporation of Maine No Drawing. Application July 28, 1945, Serial No. 607,654

5 Claims. (Cl. 260—249.5)

This invention relates to a new method for the manufacture of melamine. More particularly, the invention is directed to a method of converting dicyandiamide into melamine by first reacting the dicyandiamide with a ketone and then decomposing the reaction product by the action of a strong alkali.

In carrying out the process of my invention the dicyandiamide is first reacted with a ketone in the presence of a strong acid. This reaction forms a complex in which 2 molecular proportions of the dicyandiamide are combined with one mol of the ketone. When dicyandiamide and a strong monobasic acid such as hydrochloric acid are dissolved in acetone or methyl ethyl ketone the reaction product separates out as a crystalline compound corresponding to the formula

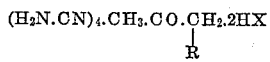

in which R is hydrogen or a methyl radical and X is the anion of the strong monobasic acid. These compounds and their method of preparation are described and claimed in my copending application Serial No. 607,653, filed concurrently herewith, now Patent No. 2,402,061, issued June 11, 1946.

When a strong dibasic acid such as sulfuric acid is used instead of hydrochloric acid no crystalline salt is obtained, but melamine is produced when the entire reaction mixture is stirred into an aqueous solution of a strong alkali. Similarly the solid condensation product is not obtained with aliphatic ketones of higher molecular weight than methyl ethyl ketone, even when strong monobasic acid is used, but the reaction mixture will still produce melamine. Cycloaliphatic ketones such as cyclopentanone and cyclohexanone behave like acetone, since they form crystalline compounds with dicyandiamide and strong monobasic acids, while the aromatic and mixed aliphatic-aromatic ketones such as benzophenone and acetophenone behave like the higher aliphatic ketones.

Melamine is obtained by mixing the above-described condensation products with a strongly alkaline solution or suspension, whereby the acid is neutralized and the compound is decomposed. Preferably the condensation product is added to an excess quantity of the alkali with vigorous agitation in order to maintain alkaline conditions in the system. The melamine-forming reaction takes place at ordinary temperatures, and can therefore be carried out in ordinary equipment without resorting to pressure vessels. The process of my invention therefore consists essentially in first condensing dicyandiamide with a ketone in the presence of at least an equimolecular quantity of an acid and then reacting the condensation product with an aqueous solution of a strong alkali. Preferably a strong mineral acid is used, and the best yields are obtained when this is a monobasic acid such as hydrochloric acid or p-toluenesulfonic acid.

The mechanism of the reaction whereby melamine is produced is most readily followed through the medium of the crystalline salts that are formed when dicyandiamide is condensed with acetone, methyl ethyl ketone or cycloaliphatic ketones in the presence of a strong monobasic acid. Two mols of dicyandiamide react with one mol of the ketone to form a crystalline salt having the composition

in which $R_1$ is a methyl radical and R a methyl or ethyl radical or $R_1$ and $R_2$ together constitute a saturated aliphatic residue of 4 to 5 carbon atoms, as in cyclopentanone or cyclohexanone, and X is the anion of the monobasic acid. When this salt is dissolved in a strongly alkaline water solution or suspension, such as a 30% solution of sodium or potassium hydroxide or a slurry of hydrated lime, it decomposes to form equimolecular quantities of melamine and of alkali cyanamide. The reaction of sodium hydroxide with the condensation product of dicyandiamide, acetone and hydrochloric acid is typical, and is as follows:

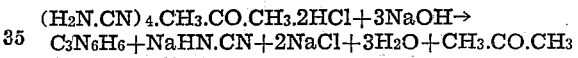

The melamine can easily be separated from the aqueous cyanamide solution containing the ketone, and the latter can easily be re-worked to recover the ketone and to convert the alkali metal cyanamide back to dicyandiamide for re-use in the reaction. Since the conversion of the complex salt to melamine is almost quantitative, high yields based on the amount of dicyandiamide used are easily obtainable.

The invention will be illustrated in greater detail by the following specific examples to which, however, it is not limited.

Example 1

420 grams (5 mols) of dicyanidiamide was added to 1,200 grams (48 mols) of acetone together with 590 grams (5.9 mols) of 37% hydrochloric acid. The mixture was agitated for 2.3 hours at 15–30° C., during which time the reactants first went completely into solution and then formed a crystalline precipitate. 55.0 grams (1.82 mols) of product were obtained in this manner. The crystals were filtered off, washed with acetone, and analyzed. The analytical results were:

|  | Per cent Nitrogen | Per cent Carbon | Per cent Hydrogen | Per cent Chlorine |
| --- | --- | --- | --- | --- |
| Theory | 37.2 | 27.9 | 5.3 | 24.2 |
| Found | 37.3 | 27.2 | 5.4 | 23.7 |

This analysis corresponds to the formula $(H_2N.CN)_4.(CH_3)_2CO.2HCl$

Example 2

42 grams of dicyandiamide were stirred into a mixture of 120 grams of acetone and 17 grams of water, and gaseous HBr was introduced with continuous agitation. A total of 40 grams of HBr was added after which the mixture was heated to remove the water along with some of the excess HBr. Upon cooling to 25° C., a crystalline reaction product was obtained. It was filtered off, washed with acetone, and dried under a vacuum at 30–50° C. The dried product, weighing 31 grams, had the composition $(H_2N.CN)_4(CH_3)_2CO.2HBr$

Example 3

Anhydrous p-toluensulfonic acid was prepared by heating the monohydrate to 115° C. under 2 mm. of mercury absolute pressure. To 19 grams of the molten anhydrous acid there was added 35 cc. of acetone, after which the solution was cooled to 55° C. 8.4 grams of dicyandiamide were then dissolved in the acidified acetone, the solution was agitated and cooled to 20° C., and the reaction product was filtered off, washed with methyl ethyl ketone and dried in a vacuum at 50° C. 23.1 grams of product were obtained having the composition:

|  | Per cent Carbon | Per cent Hydrogen | Per cent Nitrogen |
| --- | --- | --- | --- |
| Theory | 44.19 | 5.26 | 19.65 |
| Found | 45.5 | 5.3 | 20.6 |

The composition of the product was therefore $(H_2N.CN)_4.(CH_3)_2CO.2HO_3S.C_6H_5CH_3$

Example 4

42 grams of p-toluenesulfonic acid monohydrate was dissolved in 50 cc. of methyl ethyl ketone and 16.8 grams of dicyandiamide were then added. The mixture was agitated at 55° C. for 30 minutes and then cooled to 20° C. whereupon a crystalline product was formed. This was filtered off, washed with methyl ethyl ketone, and dried under a vacuum at 50° C. The dried product weighed 43.6 grams, this being a 75% yield based on the dicyandiamide used. Analysis gave the following results:

|  | Per cent Carbon | Per cent Hydrogen | Per cent Nitrogen |
| --- | --- | --- | --- |
| Theory | 45.21 | 5.48 | 19.15 |
| Found | 45.1 | 5.4 | 20.4 |

The formula of the product was $(H_2N.CN)_4.CH_3.CO.CH_2.CH_3.2HO_3S.C_6H_4CH_3$

Example 5

84 grams of dicyandiamide were dissolved in 200 grams of acetone to which 10 grams of water had been added. HCl gas was then passed into the solution until a total of 34 grams was absorbed. The mixture was then heated to boiling for a short period, cooled to room temperature, and the crystalline product filtered off, washed and dried. The dried product weighed 141 grams which, based on the dicyandiamide used, was a 91% yield. Its composition was the same as that of the product of Example 1.

Example 6

160 grams (4 mols) of sodium hydroxide were dissolved in 800 grams of water and the solution was cooled to 25–30° C. During a period of about ½ hour, 150 grams of the tetracyanamide acetone dihydrochloride of Example 1 were added to this solution with vigorous agitation, care being taken to add the crystals evenly and slowly to avoid local acidification. Sufficient hydrochloric acid was then added to neutralize the remainder of the alkali, after which the resulting slurry was filtered. The solid product, weighing 53 grams, was identified as melamine by its appearance, by its melting point of 354° C., and by the characteristic gelatinous appearance of its picrate. Analysis showed it to contain 66.2% nitrogen, theory for melamine being 66.7.

The filtrate gave a yellow precipitate with silver salts and a black precipitate with copper salts, these being characteristic reactions of cyanamide. The amount of cyanamide was determined quantitatively in an aliquot portion by weighing the copper cyanamide formed. The result, when taken with the amount of melamine formed, showed the mechanism of the reaction to be as follows:

$(NH_2CN)_4.(CH_3)_2CO.2HCl + 3NaOH \longrightarrow$
$C_3N_6H_6 \text{ (melamine)} + NaNH.CN + 3H_2O + (CH_2)CO$ On this basis the yield of melamine was 84% of theory.

Example 7

30 grams of the product of Example 1 were added to a solution of 16.8 grams of KOH in 60 grams of water as described in the preceding example. 11.9 grams of pure melamine were obtained, this yield being 94% of theory.

Example 8

30 grams of the product of Example 1 were added to a slurry of 15 grams of $Ca(OH)_2$ in 100 grams of water. The yield of melamine was 9.5 grams, or 75% of theory.

Example 9

20 grams of tetracyanamide acetone hydrobromide, the product of Example 2, were slowly added to an excess of 30% sodium hydroxide solution with agitation. 5 grams of melamine were obtained, this being 77% of theory.

Example 10

Upon adding 14.3 grams of tetracyanamide acetone p-toluenesulfonate, the product of Example 3, to an excess of 30% sodium hydroxide solution there was obtained 2.2 grams of melamine. This yield was 69% of theory.

Example 11

When 29.2 grams of tetracyanamide methyl ethyl ketone p-toluenesulfonate, the product of Example 4, was stirred into 30% sodium hydroxide solution the yield of melamine was 3.9 grams, or 62% of theory.

*Example 12*

19 grams of anhydrous p-toluenesulfonic acid were dissolved in 35 cc. of cyclohexanone and 8.4 grams of dicyandiamide were added. The mixture was agitated at 73° C. for about 3 minutes, after which it was cooled and the solid reaction product was filtered off, washed with methyl ethyl ketone and dried in a vacuum at 50° C. The dried product weighed 23.2 grams. Analysis showed it to contain 12% of guanylurea p-toluenesulfonate and 88% of tetracyanamide cyclohexanone p-toluenesulfonate of the formula $$(H_2N.CN)_4C_6H_{10}O.2HO_3S.C_6H_4CH_3$$

20 grams of this product were stirred into an excess of 30% sodium hydroxide solution. 2.7 grams of melamine were obtained, this being a 79% yield.

What I claim is:

1. A method of producing melamine which comprises mixing with an aqueous solution of a hydroxide of an alkali-forming metal a condensation product of dicyandiamide and a ketone selected from the group consisting of acetone, methyl ethyl ketone and cyclohexanone, said condensation product having the formula $$(H_2N.CN)_4.Y.2HX$$

in which Y is a member of the group consisting of acetone, methyl ethyl ketone and cyclohexanone and X is the anion of a strong acid.

2. A method of producing melamine which comprises mixing with an aqueous solution of a hydroxide of an alkali-forming metal a condensation product of dicyandiamide with acetone, said condensation product having the formula $$(H_2N.CN)_4CH_3.CO.CH_3.2HX$$

in which X is the anion of a strong mineral acid and recovering the melamine thus produced.

3. A method of producing melamine which comprises mixing with an aqueous solution of a hydroxide of an alkali-forming metal a condensation product of dicyandiamide and cyclohexanone having the formula $$(H_2N.CN)_4C_6H_{10}O.2HX$$

in which X is the anion of a strong acid and recovering the melamine thus produced.

4. A method of producing melamine which comprises mixing with an aqueous solution of a hydroxide of an alkali-forming metal a condensation product of dicyandiamide, acetone and hydrochloric acid having the formula $$(H_2N.CN)_4.CH_3.CO.CH_3.2HCl$$

and recovering the melamine thus produced.

5. A method of producing melamine which comprises mixing with an aqueous solution of a hydroxide of an alkali-forming metal a condensation product of dicyandiamide with methyl ethyl ketone, said condensation product having the formula $$(H_2N.CN)_4CH_3.CO.CH_2.2HX$$
$$\quad\quad\quad\quad\quad\quad\quad |$$
$$\quad\quad\quad\quad\quad\quad\quad CH_3$$

in which X is the anion of a strong mineral acid and recovering the melamine thus produced.

ALEXANDER F. MacLEAN.

REFERENCES CITED

The following references are of record in the file of this patent:

UNITED STATES PATENTS

| Number | Name | Date |
|---|---|---|
| 2,402,061 | McClean | June 11, 1946 |